United States Patent

Knuutila et al.

[11] Patent Number: 5,976,318
[45] Date of Patent: Nov. 2, 1999

[54] METHOD FOR BURNING SECONDARY SLUDGE IN A RECOVERY BOILER

[75] Inventors: Matti Knuutila, Pori; Jarmo Kaila, Helsinki; Jukka Vaistomaa, Pori; Keijo Imeläinen, Keminmaa; Pauli Harila, Kemi; Veli-Antti Kivilinna, Lautiosaari; Ahti Klami, Kemi, all of Finland

[73] Assignee: Tampella Power Oy, Finland

[21] Appl. No.: 09/007,566

[22] Filed: Jan. 15, 1998

Related U.S. Application Data

[63] Continuation of application No. 08/628,668, Jul. 5, 1996, abandoned.

[30] Foreign Application Priority Data

Oct. 18, 1993 [FI] Finland .................................... 934598

[51] Int. Cl.⁶ .................................................. D21C 11/00
[52] U.S. Cl. ......................... 162/29; 162/30.11; 162/31; 162/DIG. 9; 210/774; 210/928; 159/47.3
[58] Field of Search .......................... 162/16, 29, 30.11, 162/31, DIG. 9; 210/774, 758, 928; 530/205, 209; 159/47.3

[56] References Cited

FOREIGN PATENT DOCUMENTS 1066857  11/1979  Canada .

OTHER PUBLICATIONS

Frederick, W.J., "Disposal of ... Recovery System", TAPPI, vol. 64, No. 1, pp. 59–62, Jan. 1981.

Smook, G.A. "Handbook ... Tech", Angus Wilde Pub., pp. 133–140, 1992.

*Primary Examiner*—Dean T. Nguyen
*Attorney, Agent, or Firm*—Rockey, Milnamow & Katz

[57] ABSTRACT

A method for burning secondary sludge in a recovery boiler, in which method secondary sludge is mixed with black liquor. According to the method, an alkali is added to the secondary sludge so as to obtain a mixture having a pH of over 7, whereafter the mixture of alkali and secondary sludge is heated to a temperature of over 80° C. and kept at this temperature for over 30 minutes. Thereafter the heat treated mixture of alkali and secondary sludge is supplied to the thick end of a black liquor evaporation plant.

12 Claims, 2 Drawing Sheets

METHOD FOR BURNING SECONDARY SLUDGE IN A RECOVERY BOILER

CROSS REFERENCE TO RELATED APPLICATIONS

This application is a continuation of U.S. patent application Ser. No. 08/628,668, now abandoned, filed on Jul. 5, 1996 under Sec. 371 from PCT/FI94/00466 filed Oct. 17, 1994.

FIELD OF THE INVENTION

The invention relates to a method for burning secondary sludge in a recovery boiler, said method comprising mixing secondary sludge with black liquor and supplying the mixture to a recovery boiler.

BACKGROUND OF THE INVENTION

Considerable amounts of secondary sludge are produced yearly in connection with biological waste-water treatment in paper and pulp mills. Secondary sludge is mainly organic material which can be separated from the mill waste-water as suspended matter. The disposal of secondary sludge is rather problematic, as all methods currently used are costly or difficult to employ. Conventionally secondary sludge has been disposed of by trucking it to a dumping ground or composting, or burning it together with an auxiliary fuel in a solid fuel boiler.

Before being trucked to a dumping ground, secondary sludge must be pretreated. Furthermore, the treated waste material requires a great deal of space. All this is rather costly. The secondary sludge must be composted with various additives, such as bark suspension or the like. The humus which is obtained by composting and which is in principle fit for use may be difficult to sell, and it is fairly expensive to dispose of it in some other way. If secondary sludge is burnt in a solid fuel boiler, it must be mixed with at least the same amount of bark or fibre suspension. The resulting mixed suspension has a low dry solids content, approximately 30%, and therefore the burning requires an auxiliary fuel. Such burning is financially unprofitable. Another factor that increases the costs is that the fibre suspension which would thus be required to be burnt with the secondary sludge could otherwise be recirculated to the process as fibrous raw material and sold with the final product. The burning of secondary sludge in a solid fuel boiler may also involve risks because so-called super toxins, such as dioxins, may be formed from chlorine compounds at low temperatures. It is thus not recommendable to dispose of secondary sludge in this way. Moreover, the burning of secondary sludge in a solid fuel boiler increases corrosion of the heat transfer surfaces on account of low fuel temperature and the chemicals contained in the secondary sludge.

The publication "Disposal of secondary sludge in the kraft recovery system" by W. J. Frederick, T. M. Grace and T. W. Joyce, Proc. Environmental Conf. Chem. Soc. Dir. Inst. Pap. Chem., Appleton, Wis., USA 1980, pp. 43–47, discloses the burning of secondary sludge in a recovery boiler. According to this publication, fairly small amounts of secondary sludge were added to black liquor before evaporation of the black liquor. In order for the fouling of heat transfer surfaces in the evaporation plant to be reduced, the secondary sludge was treated with white liquor before being added to the black liquor. In this publication it was found to be problematic that the separation of soap is less efficient when the black liquor comprises secondary sludge.

It is also known to burn secondary sludge by mixing it with black liquor as, for example, in the solution disclosed in Finnish Patent No. 80,664. This patent discloses a method in which soap separated from black liquor and acid are added to secondary sludge so as to obtain a mixture having a pH of 2 to 5. Thereafter the sludge is dewatered by pressing to obtain a dry solids content of about 20 to 25%. The sludge is then added to the black liquor prior to the evaporation plant. In the evaporation plant, soap is separated from the black liquor comprising sludge, and the soap is reused for the treatment of secondary sludge. This solution requires that the sludge be concentrated by pressing so that it would be suitable for the process. It further requires the use of additional acid, which increases the treatment costs. Even in this solution the separation of soap is less efficient because the liquor contains sludge, which further reduces the usefulness of the method. The fouling of heat transfer surfaces is also an obvious risk in the method according to Finnish Patent No. 80,664.

BRIEF SUMMARY OF THE INVENTION

The object of the present invention is to provide such a method for burning secondary sludge in a recovery boiler in which the problems pertaining to the separation of soap and the fouling of heat transfer surfaces of the evaporation plant can be avoided more efficiently than in the previous methods. A further object of the invention is to provide an economical and environmentally safe method for disposing of secondary sludge by burning it in a recovery boiler. The method of the invention is characterized by adding an alkali to secondary sludge so as to obtain a mixture having a pH of over 7, heat treating the mixture of alkali and secondary sludge by keeping it at a predetermined temperature for a predetermined time, and mixing the heat treated mixture of alkali and secondary sludge with black liquor in the evaporation plant, after soap separation.

An essential feature of the invention is that a suitable alkali, such as sodium hydroxide or liquor taken from the pulping process, is added to secondary sludge so that the resulting mixture of alkali and secondary sludge is alkaline with a pH of preferably from 9 to 13. Another feature of the invention is that the secondary sludge is heat treated under alkaline conditions at a temperature of over 80° C., preferably 90 to 110° C., e.g. for about an hour. Still another feature of the invention is that the heat treated secondary sludge is mixed with black liquor after the separation of soap, preferably at a step where the dry solids content of the black liquor is over 25%. In addition, the invention has the essential advantage and result that the secondary sludge does not remain at the liquor cycle in the evaporation plant.

The advantage of the invention is that the alkali used in the heat treatment is derived from the pulping process or is suitable for use as a substitution chemical, such as sodium hydroxide. A further advantage of the invention is that the separation of soap can be effected without interruption, and the fouling of heat transfer surfaces in the evaporation plant can be kept to the minimum or essentially similar as without the secondary sludge. Yet another advantage is that when secondary sludge is burnt in a recovery boiler, its heat energy is recovered and environmental emissions are minimized.

BRIEF DESCRIPTION OF THE DRAWINGS

In the following the invention will be described with reference to the accompanying drawings, in which.

DETAILED DESCRIPTION OF THE INVENTION

Figure 1:
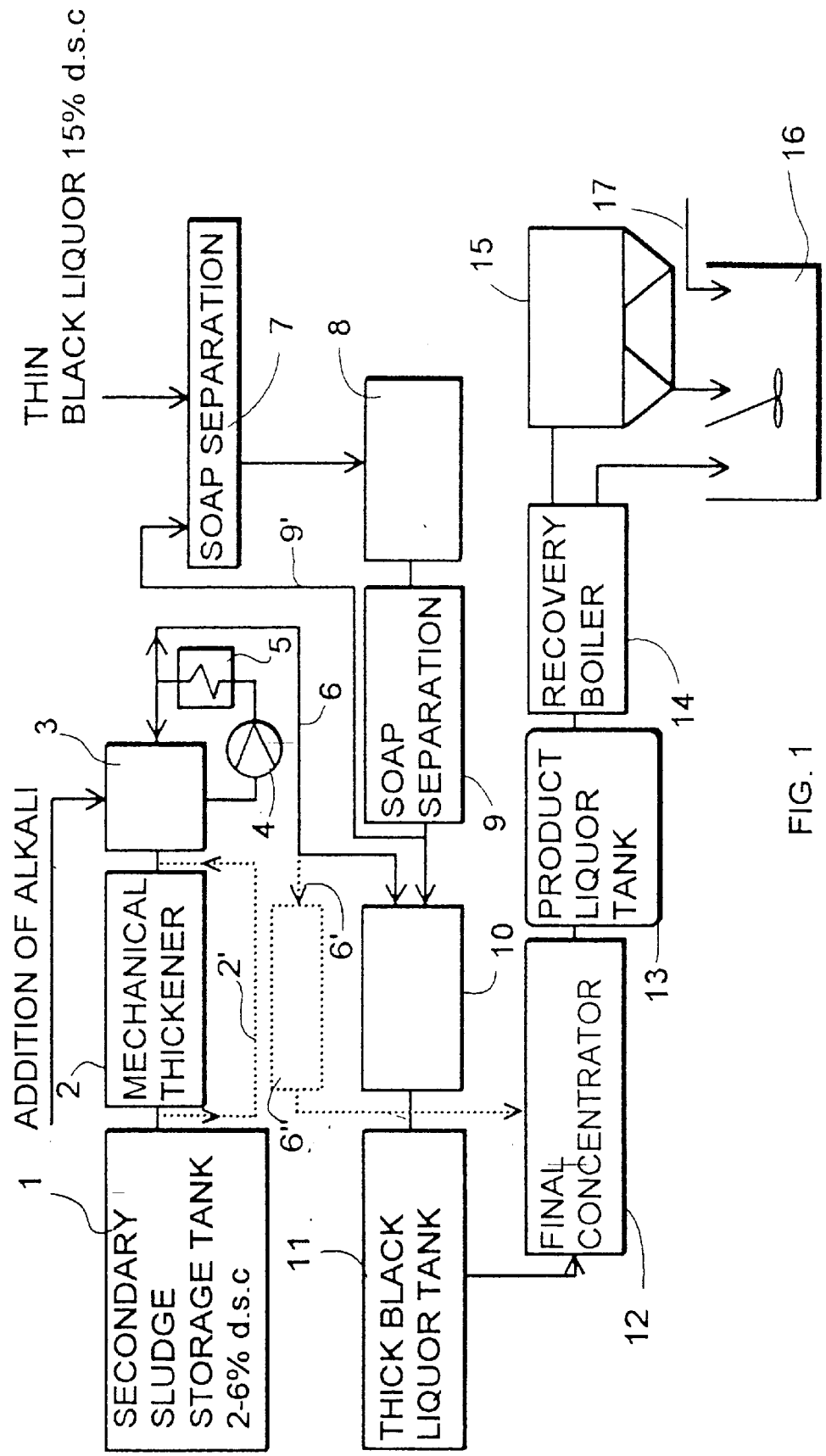
FIG. 1 is a schematic view of an embodiment of the method of the invention.
Figure 2:
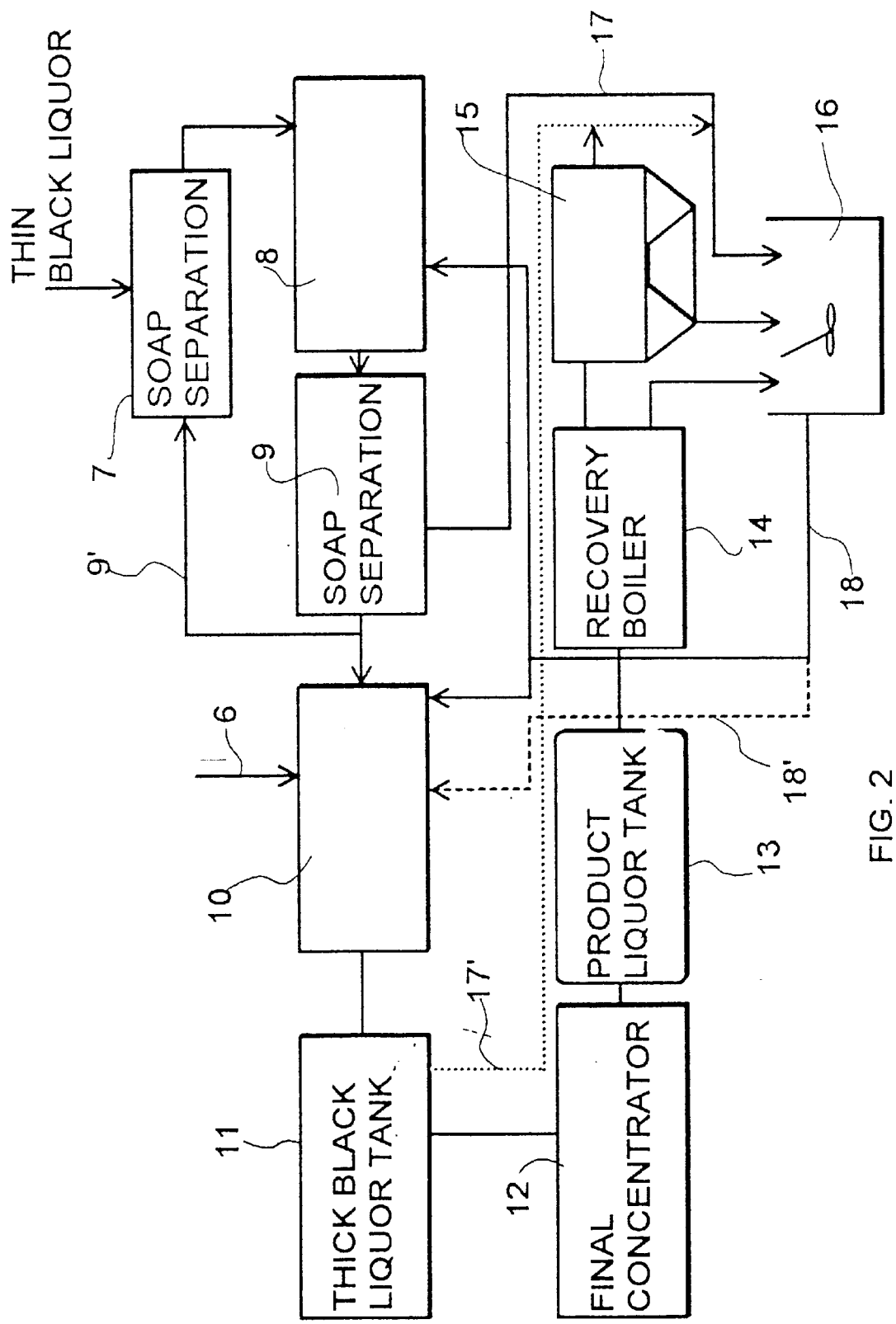
FIG. 2 is a schematic view of the transfer of crystal nuclei, which pertains to the application of the invention.

FIGS. 1 and 2 illustrate schematically a process and apparatus partially known per se for treating black liquor and feeding it into a recovery boiler, and a recovery boiler. FIG. 1 further shows an embodiment for treating secondary sludge and mixing it with black liquor. The same reference numerals are used for the same components in both figures, and they will not be defined again in connection with FIG. 2 unless necessary for the treatment or feeding of the secondary sludge. In the following description and the claims, the dry solids content (d.s.c.) is expressed as percentages by weight.

FIG. 1 shows a storage tank 1 for secondary sludge, to which secondary sludge with a dry solids content of 2 to 6% is supplied. The secondary sludge is conducted therefrom to a mechanical thickener 2, e.g. a band filter, drum filter, centrifuge or the like. From the thickener the secondary sludge is supplied to a heat treatment tank 3, to which an alkali is added so as to render the pH of the mixture of secondary sludge and alkali over 7, preferably 9 to 13. The added alkali may be sodium hydroxide, white liquor from the pulping process, oxidized white liquor or black liquor from the evaporation plant with a dry solids content of over 25%. These can be selected according to the need and also changed if necessary in view of the process. The secondary sludge can also be mixed with an alkali and heat treated without mechanical thickening, as indicated with broken line 2'. From the tank 3 the mixture of alkali and secondary sludge is circulated by means of a pump 4 through a heat exchanger 5 and back to the tank 3, and is thus heated to a temperature of over 80° C., preferably 90 to 110° C. From the tank 3 the mixture of alkali and secondary sludge, heat treated for about an hour, is conducted through piping 6 to the thick end 10 of the evaporation plant. Prior to the evaporation plant, part of the soap is separated from thin black liquor in the thin liquor tank 7, from where the thin black liquor is further conducted to the thin end 8 of the evaporation plant, whereafter the soap is finally separated from the black liquor in an intermediate liquor tank 9. The term "thin end" refers to the inlet end of an evaporation plant, i.e. the part into which thin black liquor is fed; correspondingly, the term "thick end" refers to the end part of an evaporation plant, i.e. the part towards which black liquor with a higher dry solids content flows while it is dewatered through evaporation, and from which the black liquor is supplied further to a recovery boiler. The black liquor is further supplied to the thick end 10 of the evaporation plant, to which the mixture of alkali and secondary sludge is also conducted through piping 6 after the intermediate liquor tank 9, i.e. after the soap separation step. After the intermediate liquor tank 9 part of the black liquor can be recirculated to the thin liquor tank 7 through piping 9'. From the thick end 10 of the evaporation plant the black liquor is supplied to a thick liquor tank 11, and therefrom to an additional, i.e. final, concentrator 12, in which the final step of concentration is effected, and further through a tank 13 to a recovery boiler 14. The evaporation process and equipment are generally known per se to one skilled in the art, wherefore they will not be described more closely herein. From the recovery boiler 14 flue gases are conducted to a dust filter 15, which is preferably an electrostatic precipitator. The ashes of the recovery boiler 14 and those of the electrostatic precipitator 15 are transferred to an ash mixing tank 16 and recirculated to the chemical cycle. The crystal nuclei needed in the process can also be transferred from the same ash mixing tank 16. The transfer of crystal nuclei will be described in connection with FIG. 2.

The final concentrator 12 and the concentration of liquor effected therein are known per se from U.S. Pat. No. 5,112,441, which is incorporated herein.

EXAMPLE 1

Sodium hydroxide (concentration 50%) was added to a stream of secondary sludge (12 tons of dry solids/day; dry solids content 12%; pH about 6) until a mixture having a pH of 10 to 11 was obtained (about 1000 1/day). The alkaline secondary sludge was heated to a temperature of 100° C. and kept at this temperature for 1½ hours. The secondary sludge was then supplied to an evaporation plant after an intermediate liquor tank and mixed with a stream of black liquor (1200 tons of dry solids/day; dry solids content about 30%; pH 12 to 13), which was concentrated to thick black liquor (dry solids content about 70%). The resulting thick black liquor comprising secondary sludge was further conducted to an additional concentrator, where the resulting liquor mixture was concentrated under a pressure higher than the atmospheric pressure (pressure 3.5 bar, temperature 170° C.) to product black liquor, the dry solids content of which was about 83 to 85%. The obtained product black liquor was supplied to a recovery boiler while a high pressure and an elevated temperature (1.5 bar, 135° C.) were maintained.

An alternative to the above-described feeding of secondary sludge is to conduct the mixture of alkali and secondary sludge after heat treatment through piping 6' past the thick end 10 of the evaporation plant and the thick liquor tank 11 directly to the final concentrator 12. The heat treatment and the addition of an alkali are effected as described above. A possible separate evaporation unit 6" for the concentration of merely secondary sludge is also indicated in FIG. 1 with broken lines. An evaporation unit 6" of this kind is not necessary, but under certain conditions it may be advisable to have one.

EXAMPLE 2

Sodium hydroxide (concentration 50%) was added to a stream of secondary sludge (12 tons of dry solids/day; dry solids content 12%; pH about 6) until a mixture having a pH of 10 to 11 was obtained (about 1000 1/day). The alkaline secondary sludge was heated to a temperature of 100° C. and kept at this temperature for 1½ hours. The secondary sludge was then supplied to an evaporation plant after an intermediate liquor tank and mixed with a stream of black liquor (1200 tons of dry solids/day; dry solids content about 30%; pH 12 to 13), and the resulting black liquor containing secondary sludge was evaporated to thick black liquor with a dry solids content of about 70%. The resulting thick black liquor could be supplied directly to a recovery boiler.

FIG. 2 illustrates the transfer of crystal nuclei for the process. FIG. 2 shows only that part of FIG. 1 which is necessary for the transfer of crystal nuclei. The effect of crystal nuclei and the advantages of their use in view of the evaporation process are generally known per se and obvious to one skilled in the art e.g. from "Sodium salt scaling in connection with evaporation of black liquors and pure model solutions" by Ladislav Novak, Svensk pappers-tidning No. 8, 1979, which is incorporated herein as background art. The transfer of crystal nuclei and the technology pertaining to it are also known per se and will not be described in this application. In the case of FIG. 2, crystal nuclei are transferred from the ash mixing tank 16. The above-mentioned article discloses the purpose and use of crystal nuclei in principle, whereas FIG. 2 and the associated description illustrate some technical embodiments. In addition to this, there are also known some other technical embodiments which can be used correspondingly; they will, however, not be described herein. To avoid the mixing of secondary sludge with black liquor before the separation of soap, the black liquor must be recirculated to the process after the transfer of crystal nuclei at a process step where they will not be mixed. The first alternative is to take the black liquor from the intermediate liquor tank 9. In this case, the liquor which is supplied to the ash mixing tank 16 through piping 17 does not contain secondary sludge and can be recirculated to any part of the evaporation plant through piping 18 without any problems. The second alternative is to take the liquor used for transferring crystal nuclei from the thick liquor tank 11 through piping 17' indicated with a broken line. In this case, the black liquor contains secondary sludge and cannot be recirculated to the evaporation plant before the soap separation step, as it would nullify the advantages of the invention in soap separation. Therefore the black liquor must in this case be recirculated from the ash mixing tank 16 through piping 18', indicated with a broken line, to the thick end 10 of the evaporation plant after the separation of soap.

In the above and in the drawings the invention is described merely by way of example, and it is by no means restricted to this. Depending on the structure of the evaporation plant, the location of the intermediate tanks, etc., the secondary sludge can be supplied after heat treatment to several different process steps after the soap separation step. It must, however, be borne in mind that the treated secondary sludge is not recirculated to the evaporation plant before soap separation on account of the transfer of crystal nuclei.

We claim:

1. A method for burning secondary sludge in a recovery boiler comprising the steps of:
   a) adding an alkali to secondary sludge to obtain a sludge mixture having a pH of over 7;
   b) heat treating the sludge mixture by keeping the mixture at a predetermined temperature for a predetermined time;
   c) feeding the heat treated sludge mixture to a black liquor evaporation plant and mixing the heat treated sludge mixture with black liquor in the evaporation plant after a soap separation stage to form a black liquor mixture;
   d) concentrating the black liquor mixture by dewatering the black liquor mixture through evaporation in the evaporation plant to obtain a thick black liquor mixture; and
   e) supplying the thick black liquor mixture to a recovery boiler.

2. A method according to claim 1, wherein the mixture of alkali and secondary sludge is heat treated at a temperature of over 80° C.

3. A method according to claim 2, wherein the heat treatment time is greater than 30 minutes.

4. A method according to claim 1, wherein the pH of the secondary sludge is adjusted to a value of 9 to 13 prior to the heat treatment.

5. A method according to claim 1, wherein the alkali added to the secondary sludge is sodium hydroxide.

6. A method according to claim 1, wherein the alkali added to the secondary sludge is liquor taken from a chemical cycle of a pulp mill.

7. A method according to claim 1, wherein the secondary sludge is concentrated to a dry solids content of 6 to 20% prior to the addition of an alkali.

8. A method for burning secondary sludge in a recovery boiler comprising the steps of:
   a) adding an alkali to secondary sludge to obtain a sludge mixture having a pH of over 7;
   b) heat treating the sludge mixture by keeping the mixture at a predetermined temperature for a predetermined time;
   c) feeding the heat treated sludge mixture to a black liquor evaporation plant and mixing the heat treated sludge mixture with black liquor in the evaporation plant after a soap separation stage to form a black liquor mixture;
   d) concentrating the black liquor mixture by dewatering the black liquor mixture through evaporation in the evaporation plant to obtain a thick black liquor mixture; and
   e) supplying the thick black liquor mixture to a recovery boiler,
   wherein part of the black liquor is separated and conducted to an ash mixing tank of the recovery boiler to transfer crystal nuclei and form a black liquor containing ash, and the black liquor containing ash is recirculated to step (c).

9. A method according claim, 8 wherein, for the transfer of crystal nuclei, the thick black liquor mixture is fed to the ash mixing tank, and the thick black liquor mixture containing ash is recirculated to step (c).

10. A method according claim, 8 wherein the black liquor used in step (c) is fed to the ash mixing tank for transferring crystal nuclei prior to mixing with the heat treated sludge mixture.

11. A method for burning secondary sludge in a recovery boiler comprising the steps of:
   a) adding an alkali to secondary sludge to obtain a sludge mixture having a pH of over 7;
   b) heat treating the sludge mixture by keeping the mixture at a predetermined temperature for a predetermined time;
   c) feeding the heat treated sludge mixture to a black liquor evaporation plant and mixing the heat treated sludge mixture with black liquor in the evaporation plant after a soap separation stage to form a black liquor mixture;
   d) concentrating the black liquor mixture by dewatering the black liquor mixture through evaporation in the evaporation plant to obtain a thick black liquor mixture; and
   e) supplying the thick black liquor mixture to the final concentration step of the evaporation plant in which the concentration of the thick black liquor mixture is effected under pressure at a temperature higher than the atmospheric boiling point of black liquor, and from which the concentrated thick black liquor mixture is supplied to a recovery boiler under a pressure higher than atmospheric pressure and at an elevated temperature.

12. A method according claim 11, wherein the black liquor in the evaporation plant having a dry solids content of about 30%.

* * * * *

UNITED STATES PATENT AND TRADEMARK OFFICE
CERTIFICATE OF CORRECTION

PATENT NO. : 5,976,318
DATED : November 2, 1999
INVENTOR(S) : Knuutila et al.

It is certified that error appears in the above-identified patent and that said Letters Patent is hereby corrected as shown below:

<u>Title page,</u>
Item [63], Related U.S. Application Data, should read as follows:

--          Related U.S. Application Data
[63] Continuation of application No. PCT/FI94/00466, Jul. 5, 1996. --.

Signed and Sealed this

Nineteenth Day of November, 2002

*Attest:*

*Attesting Officer*

JAMES E. ROGAN
*Director of the United States Patent and Trademark Office*

UNITED STATES PATENT AND TRADEMARK OFFICE
CERTIFICATE OF CORRECTION

PATENT NO. : 5,976,318
DATED : November 2, 1999
INVENTOR(S) : Knuutila et al.

It is certified that error appears in the above-identified patent and that said Letters Patent is hereby corrected as shown below:

<u>Title page,</u>
Item [86] and [87], please insert:

-- [86]  PCT Application No.:        PCT/FI94/00466
         Filed:                       October 17, 1994
         PCT Publication No.:         WO 95/11335 and:

-- [87]  PCT Publication No.:         WO 95/11335
         International Publication Date:  April 27, 1995 --

Signed and Sealed this

Seventeenth Day of February, 2004

JON W. DUDAS
*Acting Director of the United States Patent and Trademark Office*